US010165033B2

(12) United States Patent
Fisher

(10) Patent No.: US 10,165,033 B2
(45) Date of Patent: Dec. 25, 2018

(54) LIVE ENCODING FOR DISTRIBUTION OF LONG TAIL MEDIA CONTENT

(71) Applicant: SLING MEDIA INC., Foster City, CA (US)

(72) Inventor: Michael Fisher, San Francisco, CA (US)

(73) Assignee: SLING MEDIA LLC, Foster City, CA (US)

( * ) Notice: Subject to any disclaimer, the term of this patent is extended or adjusted under 35 U.S.C. 154(b) by 253 days.

(21) Appl. No.: 14/586,366

(22) Filed: Dec. 30, 2014

(65) Prior Publication Data
US 2016/0191596 A1 Jun. 30, 2016

(51) Int. Cl.
H04L 29/06 (2006.01)

(52) U.S. Cl.
CPC ........ *H04L 65/607* (2013.01); *H04L 65/4069* (2013.01); *H04L 65/4084* (2013.01); *H04L 65/80* (2013.01)

(58) Field of Classification Search
CPC ............... H04N 21/20; H04N 21/2181; H04N 21/2187; H04N 21/222; H04N 21/23; H04N 21/231; H04N 21/23103; H04N 21/23106; H04N 21/23109; H04N 21/23113; H04N 21/23116; H04N 21/2343; H04N 21/234309; H04N 21/23439; H04N 21/60; H04N 21/6125; H04N 21/63; H04N 19/40; H04N 21/23424; H04N 21/262; H04N 21/41407; H04N 21/6112; H04N 21/6408; H04N 21/812; H04N 19/00006; H04N 19/10; H04N 21/214; H04N 21/2347; H04N 21/235; H04N 21/2381; H04N 21/2387; H04N 21/2402; H04N 21/2408; H04N 21/25808; H04N 21/25891; H04N 21/2662; H04N 21/4126; H04N 21/4227; H04N 21/4305; H04N 21/435; H04N 21/44016; H04N 21/4402; H04N 21/440218; H04N 21/4405; H04N 21/4408; H04N 21/4424; H04N 21/4627; H04N 21/4781; H04N 21/6131; H04N 21/64715; H04N 21/6587; H04N 21/8133; H04N 21/8173; H04N 21/8458; H04N 21/85406; H04N 21/8549;
(Continued)

(56) References Cited

U.S. PATENT DOCUMENTS 8,560,629 B1 * 10/2013 Bhatti ................ H04L 67/2847
348/466
8,752,085 B1 * 6/2014 Brueck ................ H04L 65/601
725/32
(Continued)

Primary Examiner — Greg C Bengzon
(74) Attorney, Agent, or Firm — Lorena & Kopf LLP

(57) ABSTRACT

Systems, methods and devices are described to deliver media programs to remotely-located media players via a network. A media server receives a request for the media program from the remotely-located media player via the network and determines whether the requested media program has been previously encoded. If so, the previously-encoded media program is delivered to the remotely-located media player. If the requested media program has not been previously encoded, the requested media program is live encoded to thereby create a media stream encoding the requested media program in response to the request received from the remotely-located media player.

18 Claims, 2 Drawing Sheets

Figure 1:
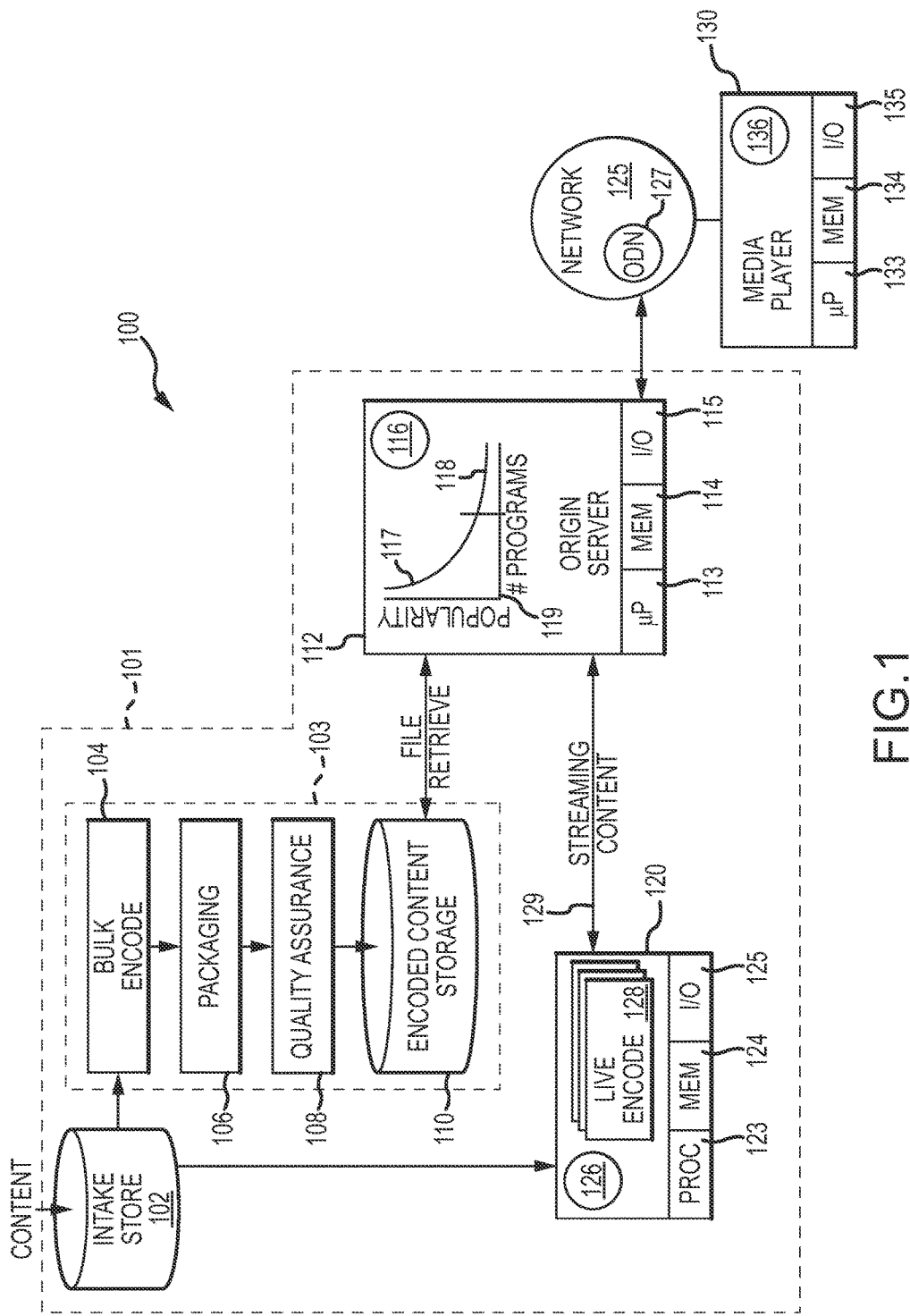

(58) Field of Classification Search
CPC .. H04N 5/917; H04N 7/1675; H04L 41/5051; H04L 45/3065; H04L 47/2416; H04L 47/801; H04L 49/206; H04L 65/00; H04L 65/4069; H04L 65/60; H04L 65/605; H04L 65/4084; H04L 65/607; H04L 65/80; H04L 65/602; H04L 65/1059; H04L 65/4076; H04L 65/4092; H04L 67/10; H04L 67/30; H04L 67/42; H04L 69/04; H04L 9/065; H04L 12/14; H04L 12/1485; H04L 29/06027; H04L 29/08; H04L 45/308; H04L 63/0428; H04L 65/403; H04L 65/601; H04L 67/02; H04L 67/2814; H04L 67/2819; H04L 67/2823; H04L 67/2842; H04L 67/303; H04L 67/306; H04L 69/16; H04L 69/161; H04L 69/22; H04L 69/24; H04L 9/0618; H04L 19/40; H04L 21/6125; H04L 21/23424; H04L 21/2343; H04L 21/23439; H04W 4/18; H04W 4/025; H04W 4/028; H04W 4/06; H04W 4/24; H04W 88/06; H04H 20/26; H04H 60/91
See application file for complete search history.

(56) References Cited

U.S. PATENT DOCUMENTS

| | | | | |
|---|---|---|---|---|
| 9,510,029 B2* | 11/2016 | Hurst | | H04N 5/783 |
| 2007/0061490 A1* | 3/2007 | Sullivan | | G11B 27/36 |
| | | | | 709/247 |
| 2008/0195664 A1* | 8/2008 | Maharajh | | G06F 17/30035 |
| 2008/0195761 A1* | 8/2008 | Jabri | | H04L 65/605 |
| | | | | 709/250 |
| 2011/0055864 A1* | 3/2011 | Shah | | H04N 7/1675 |
| | | | | 725/31 |
| 2011/0153721 A1* | 6/2011 | Agarwal | | H04L 69/16 |
| | | | | 709/203 |
| 2011/0276712 A1* | 11/2011 | Narula | | H04L 65/4092 |
| | | | | 709/231 |
| 2011/0296473 A1* | 12/2011 | Babic | | H04N 21/21 |
| | | | | 725/87 |
| 2011/0296474 A1* | 12/2011 | Babic | | H04N 21/21 |
| | | | | 725/87 |
| 2012/0179833 A1* | 7/2012 | Kenrick | | H04N 21/234309 |
| | | | | 709/231 |
| 2013/0024901 A1* | 1/2013 | Sharif-Ahnnadi | | G06F 17/30017 |
| | | | | 725/114 |
| 2013/0166580 A1* | 6/2013 | Maharajh | | H04L 65/605 |
| | | | | 707/758 |
| 2014/0189754 A1* | 7/2014 | Major | | H04L 65/4076 |
| | | | | 725/67 |
| 2014/0247887 A1* | 9/2014 | Brueck | | H04N 19/40 |
| | | | | 375/240.26 |
| 2014/0282699 A1* | 9/2014 | Fertig | | H04N 21/231 |
| | | | | 725/32 |
| 2014/0282761 A1* | 9/2014 | Bjordammen | | H04N 21/231 |
| | | | | 725/92 |
| 2014/0282762 A1* | 9/2014 | Bjordammen | | H04N 21/4667 |
| | | | | 725/92 |
| 2014/0282780 A1* | 9/2014 | Craib | | H04N 21/4126 |
| | | | | 725/110 |
| 2015/0024839 A1* | 1/2015 | Zahn | | H04N 21/4781 |
| | | | | 463/31 |
| 2015/0040161 A1* | 2/2015 | Haykinson | | H04N 21/8549 |
| | | | | 725/41 |
| 2015/0086013 A1* | 3/2015 | Metzler | | H04N 21/2343 |
| | | | | 380/210 |
| 2015/0237102 A1* | 8/2015 | Baccichet | | H04L 65/605 |
| | | | | 709/204 |
| 2016/0191954 A1* | 6/2016 | Ekstrom | | H04N 21/2347 |
| | | | | 380/201 |
| 2017/0195732 A1* | 7/2017 | Stern | | H04N 21/4668 |
| 2018/0007105 A1* | 1/2018 | Swenson | | H04L 29/06027 |

* cited by examiner

LIVE ENCODING FOR DISTRIBUTION OF LONG TAIL MEDIA CONTENT

TECHNICAL FIELD

The present disclosure generally relates to delivering video content over the Internet or another network. More particularly, the following discussion relates to efficient video distribution of long tail video content over a network through the use of live video encoding.

BACKGROUND

Video streaming services are becoming increasingly popular. Many different video on demand (VOD) services now allow viewers to obtain television programs, movies, sports and other types of video content directly over the Internet or a similar network. Most VOD services therefore maintain large libraries of video content to ensure an interesting variation of programming for their customers.

As the number of available media programs increases, however, additional costs are typically incurred for processing and storing the additional content. Generally speaking, each available program is encoded, packaged, checked for quality, and stored before it is made available to viewers. Each of these steps can require expensive computing and storage resources. Moreover, most modern VOD systems make use of content delivery networks (CDNs) to store multiple copies of media contents for convenient delivery to viewers in widely-varying geographic locations. CDN services can be expensive, particularly when nation-wide or even world-wide delivery is expected. Still further, most modern adaptive streaming techniques require that each video be encoded multiple times to create multiple copies of varying quality.

Each video offered by a conventional VOD service, then, typically requires a relatively large expenditure to encode, package, check and deliver the video content. One result of these expenditures is that most VOD services prefer to deliver only the most popular programs that are more likely to quickly recoup the service's up-front costs and to return a greater profit. A large amount of less popular program content (e.g., foreign language content, art films, independent films, content with niche audiences, etc.) therefore remains unavailable online because VOD services simply do not believe that the demand for the video would be sufficient to recoup the expense of making the video available for viewing.

It is therefore desirable to create systems and methods for efficiently and effectively delivering less popular types of video content over the Internet or another network. These and other desirable features and characteristics will become apparent from the subsequent detailed description and the appended claims, taken in conjunction with the accompanying drawings and this background section.

BRIEF SUMMARY

Systems, methods and devices are described to deliver media programs to remotely-located media players via a network. In one embodiment, a computerized media server such as an origin server or the like receives a request for the media program from the remotely-located media player via the network and determines whether the requested media program has been previously encoded. If so, the previously-encoded media program is delivered to the remotely-located media player. If the requested media program has not been previously encoded, the requested media program is live encoded to thereby create a media stream encoding the requested media program in response to the request received from the remotely-located media player.

Another embodiment relates to a system to deliver a media program to a remotely-located media player via a network. The system comprises an origin server, a data storage and a live encoder. The origin server is configured to receive a request for the media program from the remotely-located media player via the network, to determine if the requested media program has been previously encoded and to direct the delivery of the requested media program to the remotely-located media player. The data storage is configured to store previously-encoded media programs prior to delivery to the remotely-located media player. The live encoder is configured to create a media stream encoding the requested media program in response to the request received from the remotely-located media player if the requested media program has not been previously encoded.

Still other embodiments provide a rack mounted or other live encoder system to perform a live encoding of media programs. The live encoder system suitably comprises a plurality of encoder chips, each chip configured to encode a video stream for delivery to a remotely-located media player as the encoding occurs, and a processor configured to receive a request from a remote source and to direct one of the plurality of encoder chips to perform a live encoding of a media program in response to the request.

Additional embodiments could provide other systems, devices, software programs, encoders, processes, methods and/or the like that perform these or other functions. Various embodiments, aspects and features are described in detail below.

BRIEF DESCRIPTION OF THE DRAWING FIGURES

Figure 2:
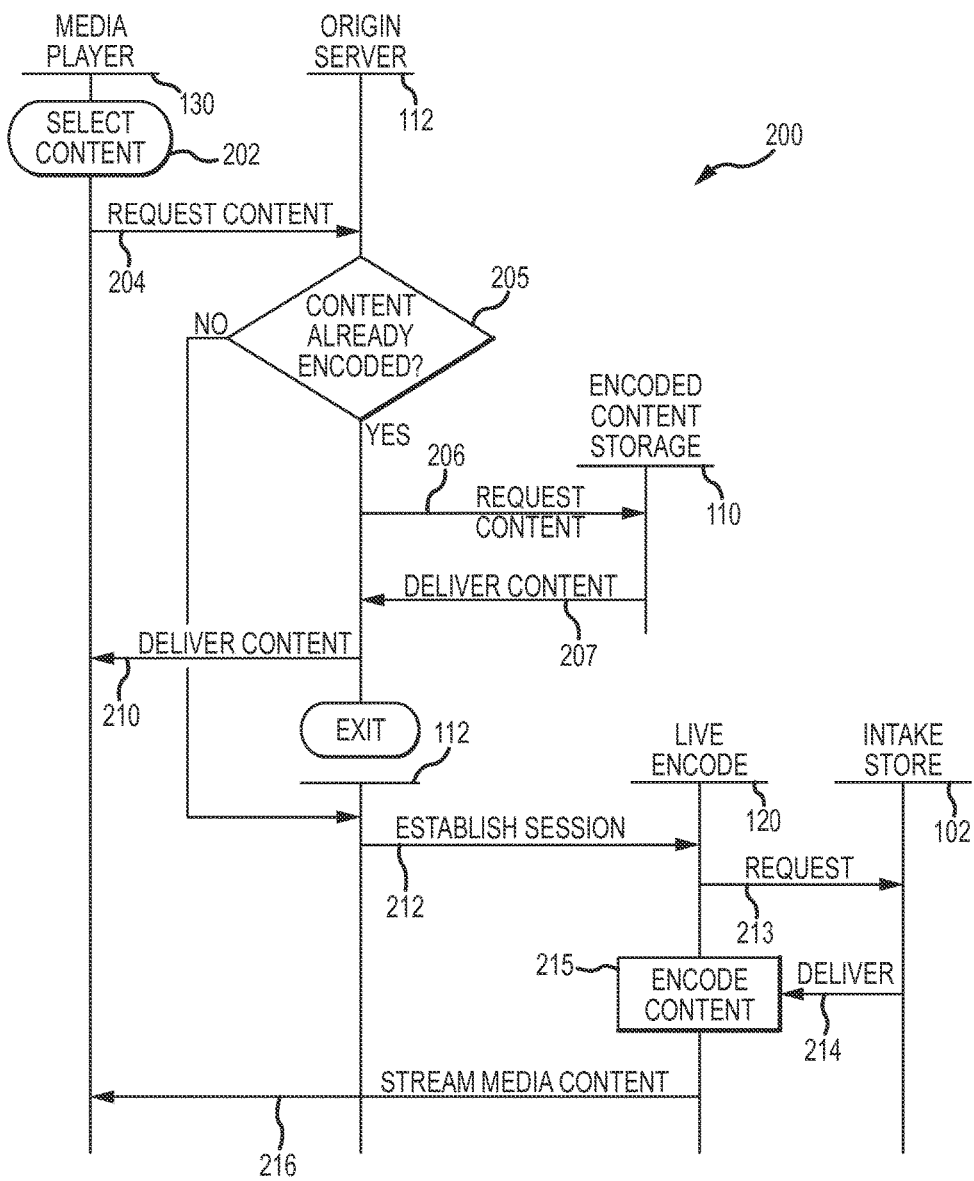

Exemplary embodiments will hereinafter be described in conjunction with the following drawing figures, wherein like numerals denote like elements, and FIG. 1 is a block diagram showing an example of a distribution system for delivering video content via a network;

FIG. 2 shows an example of a process to efficiently deliver video content via a network.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, less popular programs are delivered using live encoding/placeshifting techniques. Rather than attempting to encode and store one or more stream-ready copies of all available programs on an a priori basis, certain "long tail" programs may be encoded "as needed" to conserve processing capabilities, storage space, delivery expense and/or other resources as desired. To that end, a video on demand service may continue to use a priori encoding for blockbuster movies and other high-demand content while encoding less popular programming only on an as-needed basis. Various enhancements and modifications may be made in any number of equivalent embodiments, as described more fully below.

Turning now to the drawing figures and with initial reference to FIG. 1, an example video processing and delivery system 100 is shown. The system 100 illustrated in FIG. 1 includes a video server system 101 that encodes and delivers video programs to one or more remotely-located video player clients 130 via the Internet or another network 125. The most popular programs 117 may be encoded in advance of delivery and stored in storage 110 and/or content delivery network (CDN) 127 for immediate retrieval. Less popular programs 118, however, are encoded on an as-needed basis using a live encoder system 120 that retrieves the raw content from an intake store 102, encodes an appropriate video stream, and supplies the encoded video stream in real time (or even faster than real time!) to the media player client device 130. Because the video content is live encoded as-needed for a particular client 130, the encoding may be limited to only the formats and quality levels that are actually needed, thereby greatly reducing the amount of processing that is required, as well as the amount of bandwidth or storage space that would be required for appropriate delivery. Since the content is encoded as needed, less popular programs 118 can be provided without the additional expense that is typically associated with producing a large-scale video delivery package. Additional details are set forth below.

Video server system 101 suitably includes an intake store 102, a bulk video encoding system 103, a live encoding system 120 and an origin server 112 as appropriate. Each of the components of server system 101 is typically implemented using conventional computing hardware and software, including any sort of cloud-based data processing capabilities, as desired.

Origin server 112 is a computerized server that delivers media content 119 to one or more remotely-located media player devices 130 via network 125. In various embodiments, origin server 112 is implemented using one or more conventional network server systems that incorporate any number of processors 113, memory 114, input/output interfaces 115 and/or the like. Typically, origin server executes a software or firmware program 116 that implements the various functions described herein. Program 116 may be physically stored in memory 114 and executed by processor 113, as appropriate. Equivalent embodiments could use cloud-based computing resources to implement origin server 112, as desired. Still other embodiments may implement origin server 112 using any number of inter-operating computing systems, such as any sub-systems that provide user authentication/authorization, billing, interface handling, redundant processing, load balancing and/or other functions as appropriate.

As noted above, media content 119 distributed by system 101 may exhibit a "long tail" in the sense that relatively few programs 117 are very popular, whereas a comparatively large number of other programs 118 are considerably less popular. Stated another way, a relatively low number of programs 118 will be expected to consume a disproportionate share of the delivery resources. For these more popular programs 117, then, it is worthwhile to invest in a priori processing and storage. For the remaining programs 118 that are considerably less popular, however, it may be difficult to recoup the initial investment in such resources. To that end, system 101 includes both a bulk encoding system 103 for more popular programs 117 and a live encoding system 120 for less popular programs 118.

Both encoding systems 103 and 120 retrieve raw program content from intake store 102 and compress or otherwise format the program data for delivery on network 125. Intake store 102 is a database or other repository of received media programs prior to processing for delivery. In various embodiments, intake store 102 is a database system (including conventional processing, memory and input/output capabilities) that receives and stores master files prior to encoding or further processing. Such master files may be lightly compressed (or even uncompressed) mezzanine files or the like that are typically received from content owners, distributors or other sources. In some embodiments, intake store 102 may perform some initial processing on the received content (e.g., tagging or otherwise identifying the received content), although primary compression and other encoding will typically occur at later stages.

As noted above, the more popular programs 118 may be encoded a priori for storage on a CDN 127 or the like. Typically, encoding of such programs will be handled by a bulk encoder system 103 that provides encoding 104 into one or more appropriate formats and qualities, packaging 106, quality assurance 108, and storage for subsequent retrieval 110. Each of the various modules 106-110 may be implemented using separate computing systems (each with their own processors, memory, interfaces, etc.), or the various functions may be combined as desired. U.S. Pat. No. 8,621,099 assigned to Sling Media Inc. of Foster City, Calif. describes one example of a cloud-based bulk media intake/encoding system, although other embodiments could use any other systems and processes as desired.

Encoding module 104 suitably converts content from the master file format maintained in content store 102 to one or more compressed formats for distribution on network 125. In various embodiments, content may be converted into any number of different formats to ensure compatibility with different types of devices and media players 130. For adaptive streaming, encoder 104 may encode two or more different bit rates, frame rates, resolutions or other qualities as appropriate so that the media stream may be adapted during transmission to the player 130. U.S. Pat. No. 8,612,624 assigned to Echostar Technologies of Englewood, Colo. describes several types of adaptive streaming, although equivalent embodiments could use any other types and formats for adaptive encoding and streaming as desired. It is believed that many VOD services maintain between 100-200 different copies of each video due to the wide range of formats and video qualities that are supported.

The encoded media content is appropriately packaged by packaging module 106, which creates a bundle that can be stored with storage 110 and/or CDN 127 for delivery to media players 130 as appropriate. The formatting and distribution of video content will vary from embodiment to embodiment. In many implementations, it will be beneficial to perform a quality assurance analysis (e.g., using module 108) on the completed package to ensure that formatting and encoding were performed correctly. Quality assurance 108 will typically identify any encoding or formatting errors prior to distribution, but it can consume substantial amounts of processing resources, thereby resulting in added expense and delay.

As noted above, encoded and packaged content 118 may be stored in a database or other storage no for subsequent delivery to media players 130 via network 125. In many embodiments, origin server 112 handles requests for content 119 from media players 130. If the requested content is already encoded, then the encoded content can be retrieved from storage no for delivery and/or caching with CDN 127. Future requests for the same content may then be redirected toward CDN 127 for more effective delivery, as desired.

For content 118 that is less popular, however, the cost and delay associated with bulk encoding may be prohibitive. In such cases, it may be more preferable to simply encode the content into a live stream that is delivered to the requesting media player 130 in real time. Less popular content 118 may include, without limitation, foreign language content, content with a narrowly-targeted audiences, back catalogs of television shows or the like, independent or art films, and/or any number of other types of content that may not be as popular as content 117.

To that end, system 101 includes a live encoder module 120 that provides real-time (or faster than real time) encoding for "long tail" media content. Live encoder module 120 suitably executes a control application 126 to perform the various functions described herein. Application 126 may reside in any sort of conventional memory 124 for execution by one or more processors 124 in conjunction with input/output interfaces 125. Encoder 120 may be implemented using relatively conventional computing hardware that executes special purpose software 126. Because the video content 118 is encoded as it is needed, only the particular formats and video qualities that are actually used need to be encoded, thereby reducing the computing resources needed. Moreover, the packaging and quality assurance processing can be greatly reduced (or even eliminated), thereby further reducing the amount of processing needed. Encoding of "long tail" content 118 therefore becomes more cost effective even though demand for the content may be limited.

In some embodiments, encoder 120 is implemented using one or more rack-mounted or other programming cards that include any number of encoder chips 128 that are each capable of handling one or more live encoding sessions with media clients 130. Sling Media Inc. of Foster City, Calif. is one example of a company that has developed very efficient placeshifting technology relating to live encoding of media streams. Typically, this technology is implemented using an encoding chip that can be provided in a standalone device (e.g., any of the various placeshifting products available from Sling Media), or in a host device such as a DVR or television receiver.

Placeshifting technology may be similarly deployed using any number of chips that are integrated into a rack-mounted or other server for large-scale implementation. In one implementation, twenty-four or more processors could be integrated on a single board. One example of a processor that could be used in one embodiment is the quad-core pro grade transcoder chip available from VIXS Systems of Toronto, Canada, although other embodiments could use other quantities and/or brands of encoder chips as desired, including any chips or other processing resources that are subsequently developed. Each encoder 120 typically operates under the control of application 126 executing on processor 123, which assigns and manages the operations of the various encoder chips 128 that are provided on the board, and that handles interactions with origin server 112 or other external services as desired.

Encoder systems 120 implemented on a rack-mountable board or the like may be provided as separate products that could be marketed toward content owners, content distributors, CDNs, cloud solutions providers, and/or other customers as desired. Encoder systems 120 may therefore find use in any number of other systems 100, 101 or settings other than those illustrated in FIG. 1 or described herein.

Media player device 130 is any sort of media player, computer system, mobile phone, tablet, video game player, television, television receiver, set top box, video recorder and/or other device that is capable of receiving streaming media content via network 125. Typically, media player device 130 includes any sort of conventional hardware such as a processor 133, memory 134, input/output interfaces 135 and/or the like to carry out the various functions of a media player or the like. In various embodiments, media player device 130 executes a software application 136 that is stored in memory 134 and executed by processor 133 to carry out the various functions described herein. Software application 136 may include an application program interface (API) or software development kit (SDK) that is compatible with system 101 in general, and/or live encoder 120 in particular, to allow delivery of live encoded video streams from encoder 120. Application 136 may include a placeshifting client, for example, that is developed to be compatible with encoder chips 128, live encoder 120 and/or any other components of system 101.

Typically, viewers operate a user interface of media player 130 to select and retrieve video content 119 from server 101 via network 125. In many implementations, server 101 stores at least some of the available video content with one or more content delivery networks (CDNs) 127. CDN 127 typically maintains any number of edge servers that are geographically and/or logically distributed throughout network 125 so that users in any location can obtain relatively streamlined access to requested video files. In many embodiments, the media player 130 initially contacts server 101 directly for authentication, authorization and/or access to lists of available programs. When a desired program is selected, media player 130 may be redirected to an edge server affiliated with CDN 127 that is closer to the requesting media player 130 or that can otherwise provide more efficient delivery than the origin server 112. Typically, each edge server in CDN 127 initially receives encoded content from origin server 112. The received content may be cached at least temporarily in case another media player 130 requests the same content from the same edge server. As noted above, however, CDN services are typically relatively expensive, so caching unpopular programs 118 with a CDN 127 may result in unnecessary cost.

When a pre-encoded version of a requested program 118 is not available within system 100, media player 130 suitably interacts with system 101 to establish a live encoded video stream 129. The live stream 129 may be delivered via a direct connection between live encoder 120 (or any encoder chip 128 associated with encoder 120) and media client 130, and/or the stream 128 may be delivered via origin server 112, as appropriate. Equivalent embodiments may make use of media streaming services provided by some CDNs 127, as appropriate. That is, it may not be necessary to by-pass CDN 127 entirely if the CDN has capabilities for efficiently delivering live video streams.

FIG. 2 shows an example process 200 to deliver encoded video content 119 on a digital network 125. Generally speaking, the viewer selects content (function 202) using a media player device 130, and the requested content is delivered from storage no and/or CDN 127 if the content has already been encoded a priori (function 210). If the requested content has not been previously encoded (function 205), then the content is live encoded by encoder 120 and delivered as a live media stream 216. The various functions shown in FIG. 2 may be implemented using appropriate computing hardware executing any appropriate software, firmware and/or other logic. The preceding discussion described applications 116, 126 and 136 executing on processors 113, 123 and 133, respectively; other embodiments could execute the various functions shown in FIG. 2 with equivalent hardware, including any sort of cloud-based systems, as appropriate.

In various embodiments, software application 136 or other features of media player 130 allow the viewer to connect to server 112 to authenticate, provide billing information, and/or perform other administrative tasks as needed. Approved viewers then select content 119 to be delivered in any manner (function 202). In various embodiments, viewers operate a user interface of media player 130 to log in, to search for content and to select one of the available programs 119 for delivery. Typically, the media player application 136 will place a request 204 to origin server 112 or the like via network 125.

As noted above, the origin server 112 will deliver the requested media content differently depending upon whether the content has been previously encoded (function 205). In most cases, the more popular content 117 will be encoded on an a priori basis for immediate delivery from encoded content delivery storage no and/or CDN 127. In the example illustrated in FIG. 2, origin server 112 obtains the requested content from storage 110 (functions 206, 207) and delivers the requested content to media player 130 (function 210). In equivalent embodiments, content delivery 210 will be provided from CDN 127 or the like.

For requested content that has not been previously encoded (function 205), the origin server 112 facilitates delivery of a live-encoded stream 216. In the example shown in FIG. 2, origin server 112 contacts the live encoder 120 to establish a placeshifting session or similar connection between an encoder 128 and media client 130 (function 212). Encoder 130 then requests the appropriate content from the intake store 102 (function 213), receives the content in uncompressed or other relatively raw form (function 214), and encodes the content as appropriate (function 215). In many implementations, only one version of the requested program needs to be encoded, since the player type, the then-current network conditions, and other factors affecting the quality of the stream 216 are generally known. In various embodiments, the quality of the encoded content may be adjusted during the live streaming session to compensate for changing bandwidth conditions, changing allocation of computing resources, and/or other factors as desired. Because the stream is a custom-encoded stream that is being delivered to a particular media player 130 in real time, the encoding may be optimized or otherwise adjusted for then-current conditions. Several examples of adaptive media encoding processes are set forth in U.S. Pat. No. 8,099,755 issued to Sling Media Inc., although other embodiments may use any number of other encoding techniques as desired.

Various embodiments may have the capability to encode the stream even faster than real-time in the sense that content may be encoded and delivered to the player in advance of the viewer's actual viewing point so that the viewer is able to fast-forward, to skip commercials, to store the program for later viewing, and/or to ensure a relatively full buffer of programming in case network bandwidth degrades or other conditions threaten to interrupt the playback of the requested video. Live encoding, then, is not intended to be limited to encoding at the spot of playback, but to any encoding that occurs in response to a request for a particular program rather than on an a priori basis.

The various processes, devices and systems described herein may be readily adapted for any number of equivalent environments and applications. The term "exemplary" is used herein to represent one example, instance or illustration that may have any number of alternates. Any implementation described herein as "exemplary" is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a media server to deliver a media program to a remotely-located media player via a network, the method comprising:
    receiving a plurality of media programs in a raw format;
    storing each of the plurality of media programs in the raw format in an intake store;
    initially converting, using a first encoder device, only a first subset of the media programs corresponding to the most popular media programs from the raw format to a plurality of video streaming formats that are each stored in an encoded content storage, wherein a second subset of the media programs corresponding to long tail media content is not converted but is retained in the intake store in the raw format;
    receiving, by the media server, a request for a requested one of the plurality of media programs in a particular format, wherein the request is received from the remotely-located media player via the network and wherein the particular format is needed by the remotely-located media player;
    in response to the request, the media server determining if the requested media program is one of the more popular programs that has been previously encoded in the particular format, and, if so, the media server directing the delivery of the previously-encoded media program in the particular format from the encoded content storage to the remotely-located media player; and
    if the requested media program is long tail media content that has not been previously encoded in the particular format, the media server responding to the request by directing a second encoder device to create a live encoding of the requested media program in the particular format for delivery to the remotely-located media player via a placeshifting session, wherein the live encoding is performed in real time from a copy of the requested program in the raw format that was previously stored in the intake store to thereby create a media stream that encodes the requested media program in the particular format needed by the remotely-located media player, and wherein the live encoding in the particular format continues as the media stream is delivered to the remotely-located media player via the placeshifting session.

2. The method of claim 1 wherein the particular format is selected in response to the request received from the remotely-located media player so that media stream is encoded to a specific format that is compatible with the remotely-located media player.

3. The method of claim 2 wherein the particular format has encoding parameters corresponding to different quality levels that are further selected based upon available bandwidth on the network.

4. The method of claim 3 wherein the live encoding encodes the media stream a particular one of the different quality levels selected based upon real-time conditions of the network.

5. The method of claim 1 wherein, if the selected media program was previously-encoded, the directing of the delivery comprises retrieving the previously-encoded media program from an encoded content storage and delivering the retrieved previously-encoded media program to the remotely-located media player.

6. The method of claim 1 wherein, if the selected media program was previously-encoded, the directing of the delivery comprises directing the remotely-located media player to obtain the selected previously-encoded media program from a content delivery network associated with the network.

7. A system to deliver a requested media program to a remotely-located media player via a network, the system comprising:
an intake store configured to store a plurality of media programs in a raw format
a first encoder configured to initially convert a first subset of the media programs stored in the intake store from the raw format to a pre-encoded format, wherein the first subset of the media programs corresponds to the most popular of the media programs, and wherein a second subset of the media programs corresponding to long tail content is not converted to the pre-encoded format but is retained in the intake store in the raw format;
a second encoder;
a data storage configured to store the first subset of media programs corresponding to the most popular of the media programs in the pre-encoded format prior to delivery to the remotely-located media player; and
an origin server configured to receive a request for the media program from the remotely-located media player via the network, to determine if the requested media program has been previously encoded by the first encoder and, if so, to direct the delivery of the requested media program in the pre-encoded format from the data storage to the remotely-located media player, and if the requested media program is long tail content that has not been previously encoded by the first encoder, to direct a second encoder to create a live encoding of the requested media program in response to the request received from the remotely-located media player, wherein the second encoder converts a previously-stored copy of the requested media program that is stored in the raw format in the intake store to a particular format that is needed by the remotely-located media player as the media stream is delivered to the remotely-located media player;
wherein the second encoder establishes a placeshifting session with the remotely-located media player, and wherein the second encoder converts the requested media program from the raw format to the particular format needed by the remotely-located media player for transmission on the network in real time as the media stream is delivered to the remotely-located media player via the placeshifting session.

8. The system of claim 7 wherein the origin server comprises a processor and a memory, and wherein the receiving, determining and directing are performed by a server application that is stored in the memory and executed by the processor.

9. The system of claim 7 wherein the second encoder comprises a plurality of encoder chips, a control processor and a memory, and wherein the control processor is configured to direct the encoding of the media stream using one of the plurality of encoder chips.

10. The system of claim 7 wherein the origin server is further configured to forward the previously-encoded media program to be cached in a content delivery network.

11. The system of claim 7 wherein the first encoder is configured to retrieve original content corresponding to the requested program from an intake store, to encode the original content before the origin server receives the request from the remotely-located media player, and to direct the storage of the encoded original content corresponding to the requested program in the data storage.

12. The system of claim 11 wherein the first encoder encodes the original content multiple times to create a plurality of copies of the requested program, each of the plurality of copies corresponding to a different video format or quality of the requested program.

13. The system of claim 12 wherein the second encoder retrieves the original content from the intake store and selects an encoding format in response to the request received from the remotely-located media player so that media stream is encoded to be compatible with the remotely-located media player.

14. The system of claim 13 wherein the encoding format has encoding parameters that are further selected based upon available bandwidth on the network.

15. A video encoder system to perform a live encoding of a media program corresponding to long tail content in a set of available media programs, the video encoder system comprising:
a plurality of encoder chips, each chip configured to encode a video stream for delivery to remotely-located media players as the encoding occurs; and
a processor configured to receive a request from one of the remotely-located media players, to determine whether the request indicates a more popular media program of the set of available programs that was previously-encoded and, if the request does indicate a previously-encoded media program, to direct the delivery of the previously-encoded media program from a data storage to the remotely-located media player, and to otherwise direct one of the plurality of encoder chips to perform a live encoding of a media program corresponding to the long tail content of the set of available media programs, wherein the media program was previously received and stored in a raw format, and wherein the live encoding is performed in response to the request to thereby encode a live encoding of the previously-stored program identified by the request by the video encoder, wherein the media stream is delivered to the remotely-located media player via a placeshifting session, and wherein the live encoding converts the previously-stored program from the raw format to a particular format needed by the remotely-located media player in real time as the media stream is delivered to the remotely-located media player via the placeshifting session.

16. The system of claim 15 wherein the processor is further configured to establish placeshifting sessions between the encoder chips and the remotely-located media players.

17. The system of claim 15 wherein each encoder chip is configured to convert a requested media program from the raw format to an encoded format for transmission on the network.

18. The system of claim 17 wherein the encoded format is selected in response to the request received from the remotely-located media player so that media stream is encoded to be compatible with the remotely-located media player.

\* \* \* \* \*